Nov. 11, 1958  J. HERRMANN  2,859,853
LOADING DEVICE
Filed May 25, 1955
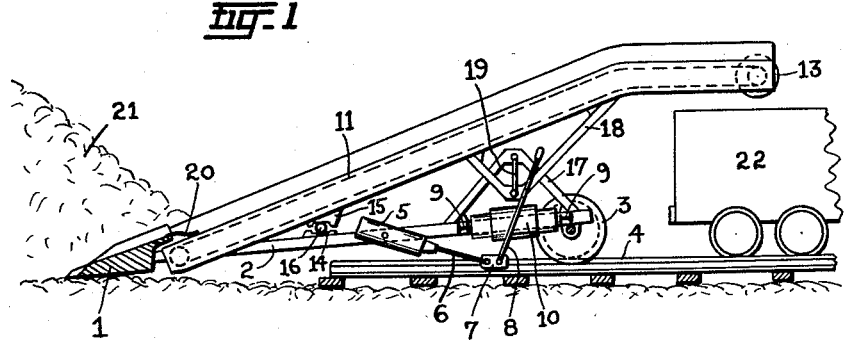
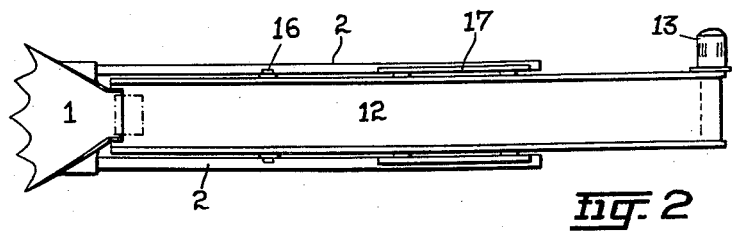
INVENTOR
JULIUS HERRMANN
BY Burgess and Dinklage
ATTORNEYS

United States Patent Office 2,859,853
Patented Nov. 11, 1958

2,859,853

LOADING DEVICE

Julius Herrmann, Lunen, Germany

Application May 25, 1955, Serial No. 510,989

7 Claims. (Cl. 198—10)

This invention relates to an improved loading device. The invention more particularly relates to an improved combination oscillating shovel loader and conveyor. Oscillating loading shovels and conveyors are known. These devices consist of a loading shovel and an inclined conveyor such as a belt or scraper conveyor defining an upwardly inclined path of travel for material from the loading shovel. An oscillating generator is connected to the loading shovel for imparting to the same lineal oscillations of a relatively high frequency of, for example, 180–1500 vibrations per minute of a small longitudinal amplitude of, for example, about 5–100 mm. The device is used for the loading of divided material, such as coal or the like. The loading shovel is urged against the base of the pile of the divided material and the oscillation drive forces the same into and beneath the pile of material forcing the material on to the conveyor along which it is removed and deposited into another conveyor car or the like for removal.

In view of the high frequencies the inertia forces and the fact that the material to be loaded must be conveyed along the shovel in a horizontal or upwardly inclined direction, the oscillations imparted to the shovel are limited to a back and forward motion of approximately the same stroke, as, for example, a substantially sinusoidal reciprocating motion.

Due to practical considerations, the length of the loading shovel should be maintained as short as possible and the conveyor should be positioned directly back of the same. Inasmuch as the oscillating drive must be arranged behind the shovel, it is necessary to position the conveyor at least partially above this drive or its connected parts.

If, however, the oscillations are imparted to the conveyor, the same will not function properly and a good deal of the oscillating energy intended for the shovel will be expended in vibrating the conveyor.

One object of this invention is to overcome this disadvantage. This, and still further objects will become apparent from the following description read in conjunction with the drawing, in which:

Fig. 1 is a diagrammatic side elevation of an embodiment of a loading device in accordance with the invention, and Fig. 2 is a plan view of the embodiment shown in Fig. 1.

The loading device in accordance with the invention has a base member with a loading shovel connected at its forward end. Means such as a conventional oscillating generator are provided for imparting longitudinal oscillations to the loading shovel, thus necessarily to the base member. An inclined conveyor is positioned behind the loading shovel and defines an upwardly inclined path of travel for material from the shovel. In accordance with the invention, the conveyor is mounted on the base member for substantially free limited movement in the direction of the oscillations of the shovel. In view of this connection, the conveyor will not be oscillated or vibrated to any great extent, and yet will maintain its necessary spacial relationship with respect to the loading shovel.

The conveyor may, for example, be resiliently connected to the base member, as, for example, by springs or the like; may be connected to the base member by a swing-like connection; and may rest by means of roller on an arcuate rail section connected to the base member so that the conveyor always tends to maintain the same specific position with respect to the base.

In the embodiment shown in the drawing, the base member 2 is mounted on the rail wheels 3, which may be moved along the rail tracks 4. A loading shovel 1 is connected at the forward end of the base member 2. An air piston cylinder arrangement 5 is connected to the base 2, and by means of the piston rod 6 to the clamp 7. The clamp 7 may be attached to the rail 4 by means of the lever handle 8. By charging air to one side of the piston in the piston cylinder arrangement 5, the base member 2 is urged forward, resiliently forcing the loading shovel 1 into the pile of material to be loaded. By charging the other side of the piston cylinder arrangement 5, the shovel may be withdrawn. The base member 2 has two cross beams 9. Between these cross beams 9 and oscillating motor 10 is positioned. This oscillating motor 10 may be an oscillating motor of any known or conventional construction for imparting lineal oscillations to the base 2 and the loading shovel 1 at, for example, a frequency of about 180 to 1500 vibrations per minute and an amplitude of about 5–100 mm. The oscillating motor as shown consists of a compressed air motor with a cylinder and differential piston oscillating therein. The central annular portion of the piston is the working portion, while the outer portions form, together with the cylinder heads, air buffers which take up the inertia energy imposed on the piston and return it to the piston upon the reversal of direction. Accordingly the piston and the cylinder with parts connected therewith, effect opposite oscillations, which correspond approximately to longitudinally sinusoidal oscillations. As the loading shovel 1 is rigidly connected by means of base member 2 with the cylinder of the motor 10, it carries out the same oscillations.

Positioned behind the shovel and defining an outwardly inclined path of travel for material from the shovel is the belt conveyor 11 of conventional construction. The belt conveyor 11 has the endless belt 12, which is rotated around end rollers by means of the drive motor 13.

Connected to the base 2 is the arcuate roller path 14. A corresponding opposed arcuate roller path 15 is connected to the conveyor. A roller 16 is freely positioned between these roller paths, so that the conveyor 11 is supported on the base 2 through the roller 16 by means of the roller paths 14 and 15, and may freely move in the direction of the oscillations caused by the oscillating motor 10, and yet will tend to assume a given position with respect to the base 2, due to the arcuate shape of the roller paths 14 and 15.

As a further support mounting for the conveyor 11, a trestle 17 is connected to the base 2, and a corresponding inverted trestle 18 is connected to the conveyor 11. The trestle 18 is swingably mounted on the trestle 17 by means of the pendulum lever connection 19. By means of this swinging suspension the conveyor 11 is mounted for free movement in the direction of the oscillations caused by the motor 10, and yet will tend to assume a given position with respect to the base 2.

A rubber apron 20 defines a continuous transfer surface from the loading shovel 1 to the conveyor belt 12.

In operation, the device is rolled on the wheels 3 along the rails 4, until the fore end of the loading shovel 1 contacts the base of the pile of material 21 to be rolled, which may consist of any divided material such as coal, The clamp 7 is then clamped to rail 4 by means of the lever 8, and air is charged into the piston cylinder arrangement 5 to resiliently force the base member 2 forward and the loading shovel 1 in contact with the pile of material 21. The oscillating motor 10 is started and the motor 13 is started, which causes rotation of the endless belt 12, so that the upper portion thereof moves upwardly. A loading car 22 is positioned below the discharge end of the conveyor 11. Due to the oscillations caused by the oscillating motor 10, the loading shovel 1 digs in under the pile of material and conveys material up along its surface over the apron 20 on to the endless belt 12. Due to the suspension arrangements 17, 18, 19, and 14, 15, 16, the oscillations of the motor 10, the base member 2, and the loading shovel 1 are not substantially imparted to the conveyor 11, and yet the conveyor 11 will maintain its proper position with respect to the loading shovel 1. The material deposited on the endless belt 12 is passed into the loading car 22 for removal.

If it is desired to withdraw loading shovel 1 from the material, the cylinder-piston arrangement 5 may be charged on the opposite side automatically retracting the base member and shovel.

I claim:

1. Loading device comprising a base member, a loading shovel connected to the forward end of said base member, means for imparting lineal oscillations to said base member and loading shovel, and an inclined conveyor positioned behind said loading shovel defining an upwardly inclined path of travel for material from said shovel, said conveyor being mounted on said base member for substantially free limited movement with respect to said base member in the direction of the oscillations of said shovel and base member, whereby said conveyor is not substantially imparted by said oscillations.

2. Loading device according to claim 1, in which said conveyor is resiliently connected to said base member.

3. Loading device according to claim 1, in which said base member and said conveyor have opposed arcuate roller paths connected thereto, and in which said conveyor is supported on said base member by a roller positioned between said roller paths.

4. Loading device according to claim 1, in which said conveyor is swingably connected to said base member by a pendulum lever.

5. Loading device according to claim 1, in which said base member has an upwardly directed trestle connected thereto and in which said conveyor has a downwardly connected opposed trestle connected thereto, and including a pendulum lever connecting said trestles and swingably supporting said downwardly directed trestle on said upwardly directed trestle.

6. Loading device according to claim 1, in which said conveyor is a belt conveyor.

7. Loading device according to claim 1, including means for resiliently urging said base member forward.

References Cited in the file of this patent

UNITED STATES PATENTS

| 736,753 | Marcus | Aug. 18, 1903 |
| 1,000,337 | Leyner et al. | Aug. 8, 1911 |
| 1,422,270 | Illingworth | July 11, 1922 |
| 1,587,396 | Mason | June 1, 1926 |

FOREIGN PATENTS

| 1,039,478 | France | May 13, 1953 |